United States Patent
Yamane et al.

[11] Patent Number: 5,450,824
[45] Date of Patent: Sep. 19, 1995

[54] COMPRESSION RATIO CONTROL FOR INTERNAL COMBUSTION ENGINE

[75] Inventors: Michihiro Yamane, Isehara; Akinobu Yoshibe, Kamakura; Shuichi Nishimura, Yokohama, all of Japan

[73] Assignee: Nissan Motor Co., Ltd., Yokohama, Japan

[21] Appl. No.: 185,152

[22] Filed: Jan. 24, 1994

Related U.S. Application Data

[63] Continuation of Ser. No. 828,456, Jan. 31, 1992, abandoned.

[30] Foreign Application Priority Data

Jan. 31, 1991 [JP] Japan .................. 3-010787

[51] Int. Cl.⁶ ........................ F02D 15/00
[52] U.S. Cl. ........................ 123/90.15
[58] Field of Search .......... 123/90.15, 90.16, 90.17, 123/90.18

[56] References Cited

U.S. PATENT DOCUMENTS

| | | | |
|---|---|---|---|
| 4,131,096 | 12/1978 | Mitchell | 123/90.15 |
| 4,592,310 | 6/1986 | Hitomi et al. | 123/90.15 |
| 4,703,734 | 11/1987 | Aoyama et al. | 123/90.15 |
| 4,714,057 | 12/1987 | Wichart | 123/90.15 |
| 4,917,057 | 4/1990 | Seki | 123/90.16 |
| 4,917,058 | 4/1990 | Nelson et al. | 123/90.17 |
| 4,960,084 | 10/1990 | Akasaka et al. | 123/90.017 |
| 4,996,966 | 3/1991 | Hitomi et al. | 123/559.3 |
| 5,022,357 | 6/1991 | Kawamura | 123/90.15 |
| 5,027,753 | 7/1991 | Hamazaki et al. | 123/90.15 |
| 5,133,310 | 7/1992 | Hitomi et al. | 123/90.16 X |
| 5,224,460 | 7/1993 | Havstad et al. | 123/90.16 |
| 5,230,320 | 7/1993 | Hitomi et al. | 123/90.15 |

FOREIGN PATENT DOCUMENTS 62-121811  6/1987  Japan .
62-191636  8/1987  Japan .

OTHER PUBLICATIONS

F001637, "Nissan Infinity Q45" (Oct. 1989), pp. B-41 and B-42.

*Primary Examiner*—Marguerite Macy
*Attorney, Agent, or Firm*—Foley & Lardner

[57] ABSTRACT

An internal combustion engine has an intake valve and an exhaust valve. When the engine operates at low speed with low and medium load, the intake valve is operated to close at a relatively advanced timing for increased volumetric effeciency and increased real compression ratio. When the engine operates at low speeds with high load, the exhaust valve is operated to close at a relatively retarded timing with the intake valve being operated to close at the relatively advanced timing, whereby the volumetric efficiency is subject to a drop to prevent occurrence of knocking.

4 Claims, 5 Drawing Sheets

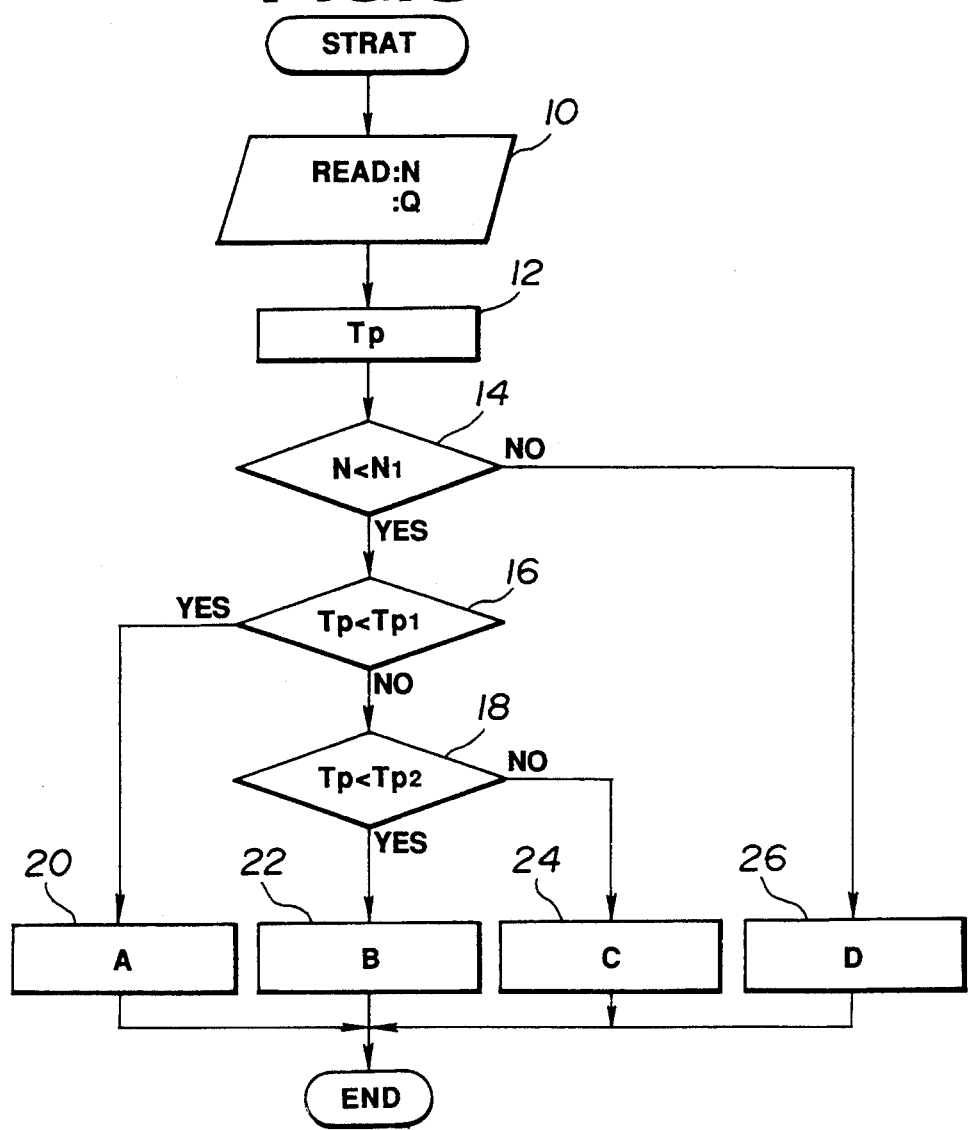
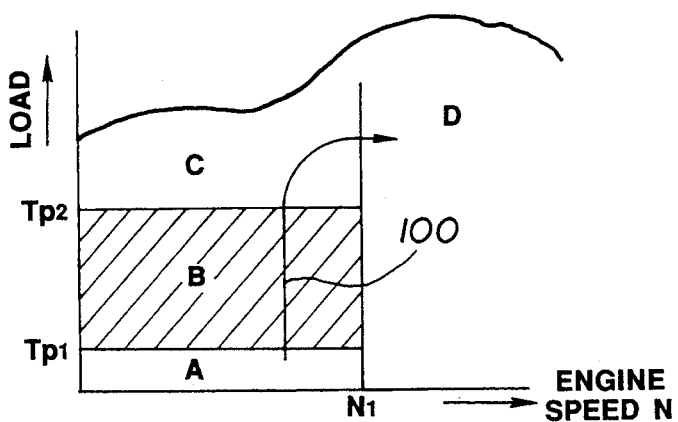

COMPRESSION RATIO CONTROL FOR INTERNAL COMBUSTION ENGINE

This application is a continuation of application Ser. No. 07/828,456, filed Jan. 31, 1992 now abandoned.

BACKGROUND OF THE INVENTION

The present invention relates to a compression ratio control for an internal combustion engine.

There is a growing demand for a remarkable reduction in fuel consumption in addition to excellent output power performance. In order to improve fuel economy, one effective measure is to increase compression ratio to enhance thermal efficiency. However, if the compression ratio is increased to a sufficiently high level, there occurs frequent knocking during engine operation with high load, particularly at low speeds with high load. In order to improve output performance, it is known as effective measure to employ a variable valve timing control system or a variable valve lift system. However, with these valve operating systems, the amount of intake air is increased, causing an increase in real compression ratio. As a result, the tendency of knocking to occur increases during operation at low speed with high load. The real compression ratio is expressed as a product of volumetric efficiency and apparent compression ratio. This term real compression ratio is used in the following description.

An object of the present invention is to provode a control for an internal combustion engine in which occurrence of knocking is prevented while the engine operates at high real compression ratio.

SUMMARY OF THE INVENTION

According to one aspect of the present invention, an intake valve of an internal combustion engine is operated to close at a relatively advanced timing for increased volumetric efficiency and increased real compression ratio when the engine speed is lower than a predetermined engine speed value with the engine load lower than a predetermined reference, and the engine exhaust valve is operated to close at a relatively retarded timing with the intake valve being operated to close at the relatively advanced timing when the engine is lower than the predetermined engine speed value with the engine load greater than the predetermined reference, whereby the volumetric efficiency is subject to a drop to prevent occurrence of knocking.

According to another aspect of the present invention, the intake valve and the exhaust valve are operated in accordance with predetermined low speed valve lift diagrams for increased volumetric efficiency and increased real compression ratio when the engine speed is lower than the predetermined engine speed value with the engine load lower than the predetermined reference, and one of the intake and exhaust valves are operated in accordance with a predetermined high speed valve lift diagram with the other being operated in accordance with the predetermined low speed valve lift diagram when the engine speed is lower than the predetermined engine speed value with the engine load greater than the predetermined reference, whereby the volumetric efficiency is subject to a drop to prevent occurrence of knocking.

BRIEF DESCRIPTION OF THE DRAWINGS

FIG. 3 is a flow diagram illustrating job procedure performed in the system;

FIG. 4 is a map illustrating various ranges of engine operation;

DETAILED DESCRIPTION OF THE INVENTION

Figure 1:
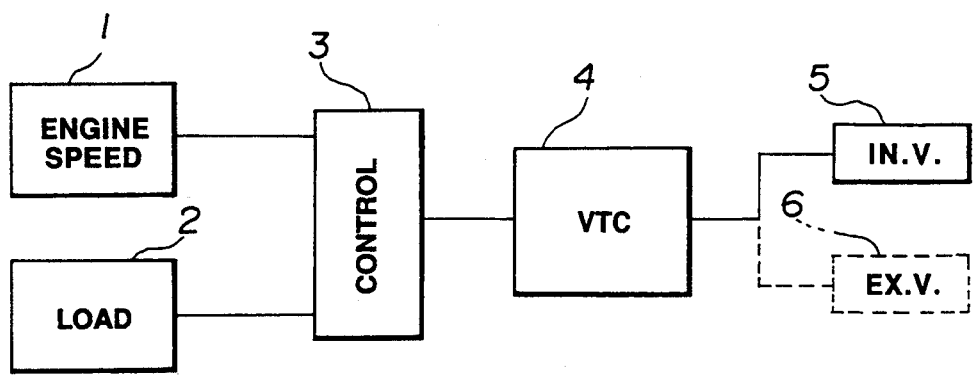
FIG. 1 is a block diagram of a system according to the present invention.

Referring to FIG. 1, a first embodiment of a system according to the present invention is explained. The invention is applied to an internal combustion engine with a double overhead cam type valve gear. As shown in diagram, the system is adapted to an intake valve 5 and an exhaust valve 6 which are arranged on a cylinder of the engine for ease of explanation. The system comprises an engine speed sensor 1, an engine load sensor 2, a control unit 3, and a valve actuator 4. In order to control valve timings of the intake and exhaust valves 5 and 6 in a variable and independent manner, the valve actuator 4 employs a variable valve timing control mechanism attached to the intake and exhaust cam shafts, respectively. The variable valve timing control (VTC) mechanisms are well known and described on pages B-41 and B-42 of a Service Manual entitled "NISSAN INFINITY Q45" (F001637) published in Japan in October 1989 by NISSAN MOTOR COMPANY LIMITED. For a detailed explanation of construction and operation, reference is made to U.S. Pat. No. 4,960,084 which is hereby incorporated by reference in its entirety. Reference may be made to Japanese Patent Application First Publication No. 62-191636. The VTC mechanisms include solenoids, respectively, which are connected to the control unit 3. The control unit 3 is of the microcomputer based control module including as usual a central processor unit (CPU), a read only memory (ROM), a random access memory (RAM), an input interface and an output interface. The control unit 3 recognizes operating conditions under which the engine is operating by reading sensor output signals of the engine speed sensor 1 and load sensor 2. In this example, the engine speed sensor 1 is in the form of a crankangle sensor which generates an engine speed signal N, while the engine load sensor 2 is in the form of an air flow meter which generates an intake air flow rate signal Q. The control unit 3 processes the information derived from reading operations of the engine speed signal N and intake air flow rate signal Q to generate output signals to be supplied to the solenoid of the VTC mechanisms. This is specifically explained along with a flow diagram shown in FIG. 3. This flow diagram illustrates a control program stored in the ROM.

Figure 5:
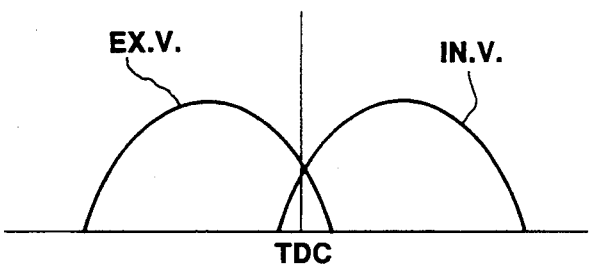
FIG. 5 is a valve timing diagram.
Figure 6:
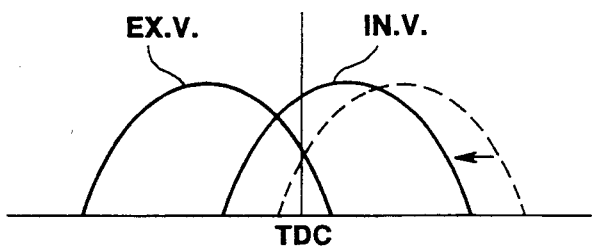
FIG. 6 is a valve timing diagram during engine operation range at low and intermediate speeds with low or intermediate load.
Figure 7:
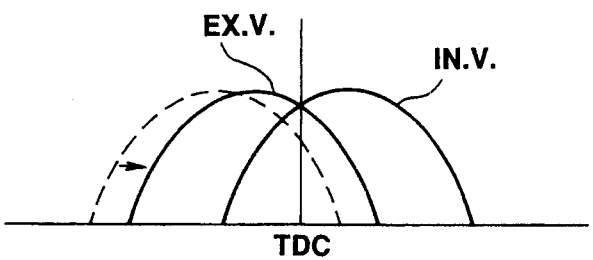
FIG. 7 is a valve timing diagram during engine operation range at low and intermediate speed with high load.
Figure 8:
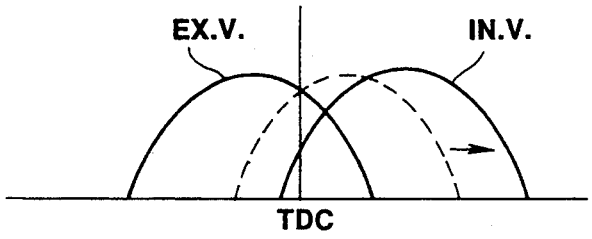
FIG. 8 is a valve timing diagram during engine operation range at high speeds.

In FIG. 3, at a step 10, reading operations of the outputs of the crankangle sensor 1 and intake air flow meter 2 are performed and the results are stored as an engine speed data N and an intake air flow rate data Q. At a step 12, a basic fuel amount $T_P$ as expressed by a function of N and Q is determined. There is an interrogation at a step 14 whether N is less than a predetermined engine speed value $N_1$. If this is the case, there is another interrogation at a step 16 whether the basic amount $T_P$ is less than a first predetermined reference $T_{P1}$. If this is the case, the routine proceeds to a step 20. At the step 20, an appropriate valve timing for a range A as illustrated in FIG. 4 is set. The appropriate valve timing is illustrated in FIG. 5. If the interrogation at the step 16 results in negative, there is another interrogation at a step 18 whether the basic amount $T_P$ is less than a second predetermined reference $T_{P2}$ ($T_{P2} > T_{P1}$). If this is the case, the routine proceeds to a step 22. At the step 22, an appropriate valve timing for a range B as illustrated in FIG. 4 is set. The appropriate valve timing for the range B is illustrated in FIG. 6. If the interrogation at the step 18 results in negative, an appropriate valve overlap for a range C as illustrated in FIG. 4 is set. The appropriate valve timing for the range C is illustrated in FIG. 7. If the interrogation at the step 14 results in negative, an appropriate valve timing for a range D as illustrated in FIG. 4 is set. The appropriate valve timing for the range D is illustrated in FIG. 8. The output signals are supplied to the solenoids of the VTC mechanisms to establish valve timing set at one of the steps 20, 22, 24 and 26.

FIGS. 5, 6, 7 and 8 are now specifically explained. For ease of explanation, it is assumed that the engine state shifts as shown by an arrow 100 drawn on the map shown in FIG. 4.

Within the range A, in order for stable idle operation with minimized residual gas, the solenoid of the VTC mechanism for the intake valve 5 is supplied with OFF signal from the control unit 3, and the solenoid of the VTC mechanism for the exhaust valve 6 is supplied with OFF signal, allowing the intake and exhaust valves 5 and 6 to assume their basic valve timings as illustrated in FIG. 5. With these basic valve timings, the valve overlap is the smallest.

Upon a shift from the range A to the range B, the signal supplied to the solenoid of the VTC mechanism for the intake valve 5 changes from OFF to ON. This causes the valve timing of the intake valve 5 to shift from the basic position (drawn by broken line) to an advanced position (drawn by the fully drawn line), causing the valve overlap to increase to a medium degree. Owing to an advanced closing timing of the intake valve 5, an increased volumetric efficiency is given, providing the highest real compression ratio. The highest setting of the real compression ratio is achieved merely by advancing the closing timing of the intake valve since the engine operates at low speeds.

Upon a shift from the range B to the range C, the signal supplied to the solenoid of the VTC mechanism for the exhaust valve 6 changes from OFF to ON. This causes the valve close timing of the exhaust valve 6 to shift from the basic position (drawn by the broken line) to a delayed position (drawn by the fully drawn line), causing the valve overlap to increase to the maximum degree. Owing to the increased degree of valve overlap, the retraction volume is increased, resulting in a drop in volumetric efficiency to cause a drop in real compression ratio. Owing to this drop in real compression ratio, occurrence of knocking is prevented without relying on spark retard control.

Upon a shift from the range C to the range D, the signal supplied to the solenoid of the VTC mechanism for the intake valve 5 changes from ON to OFF. This causes the valve close timing of the intake valve 5 to shift from the advanced position (drawn by the broken line) to the basic position (drawn by the fully drawn line), causing the valve overlap to decrease to the medium degree. The valve close timings of the exhaust and intake valves 6 and 5 are at the delayed positions. As the engine speed is high, the volumetric efficiency is increased.

In the above discussed system, both the intake and exhaust valves 5 and 6 are controlled by the VTC mechanisms. If desired, the VTC mechanism for the exhaust valve 6 may be disabled or removed. In this case, the VTC mechanism for the intake valve 5 is controlled in the following manner.

Figure 12:
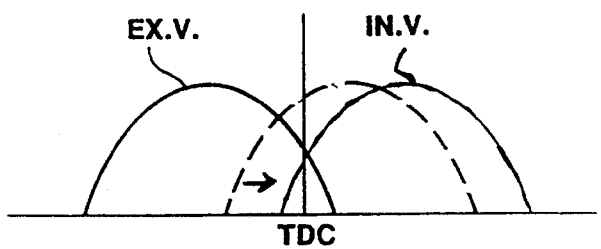
FIG. 12 is a valve timing diagram during engine operation at low and intermediate speeds with high load.
Figure 13:
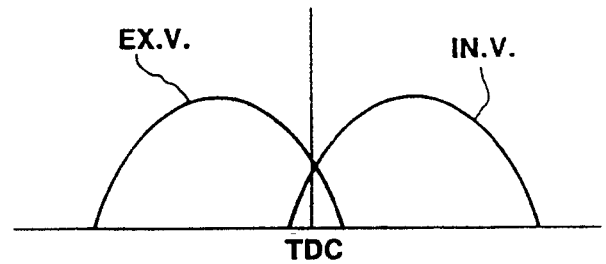
FIG. 13 is a valve timing diagram during engine operation at high speeds.

Within the range A, OFF signal is supplied to the solenoid of the VTC mechanism for the intake valve 5. An appropriate valve timing for range A is illustrated in FIG. 5. Upon a shift from the range A to range B, the signal supplied to the solenoid of the VTC mechanism changes from OFF to ON, causing the valve close timing of the intake valve 5 to shift from the basic position to an advanced position. An appropriate valve timing for range B is illustrated in FIG. 6. Thus, the maximum real compression ratio is provided within the range B. Upon a shift from the range B to the range C, the signal supplied to the solenoid of the VTC mechanism for the intake valve 5 changes from ON to OFF, allowing the close timing of the intake valve 5 to shift to the basic position. This causes a drop in volumetric efficiency, thus preventing occurrence of knocking. An appropriate valve timing for range C is illustrated in FIG. 12, showing a shift in the timing of intake valve 5 from an advanced position (shown in broken lines) to the basic position (shown in the fully drawn line). This valve timing of the intake valve 5 holds upon a shift from the range C to the range D. An appropriate valve timing for range D is illustrated in FIG. 13, showing the same timing and overlap as in FIG. 12. Within the range D, the volumetric efficiency is increased since the engine speed increases to high speeds.

Figure 2:
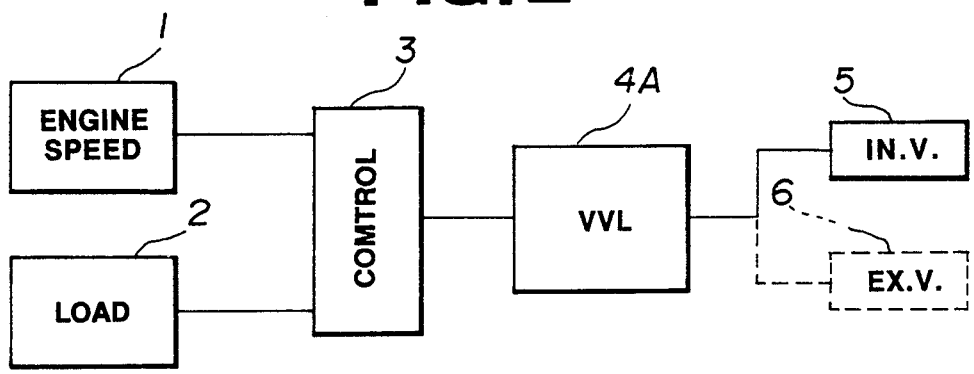
FIG. 2 is a block diagram of another system according to the present invention.

Referring back to FIG. 2, another embodiment of a system according to the present invention is explained. This system is substantially the same as the system shown in FIG. 1 except a valve actuator 4A. The valve actuator 4A employs variable valve lift mechanisms for an intake valve 5 and an exhaust valve 6, respectively. The variable valve lift (VVL) mechanisms are well known from Japanese Patent Application First Publication No. 62-121811. The known VVT mechanism comprises a low speed low lift cam and a high speed high lift cam. A plurality of rocker arms are provided which are locked by a lock plunger. The rocker arms are movable in an independent manner if the lock plunger is withdrawn from its lock position. The movement of the lock plunger is hydraulically controlled. Supply of the hydraulic pressure to the lock plunger is controlled by a solenoid. The operation is such that a switch from operation of the valve by the low speed cam to operation thereof by the high speed cam is made by changing the state of the solenoid.

A control unit 3 is substantially the same as its counterpart shown in FIG. 1 and changes the pattern of signals supplied to the solenoids of the VVL mechanisms for the intake and exhaust valves 5 and 6.

Figure 9:
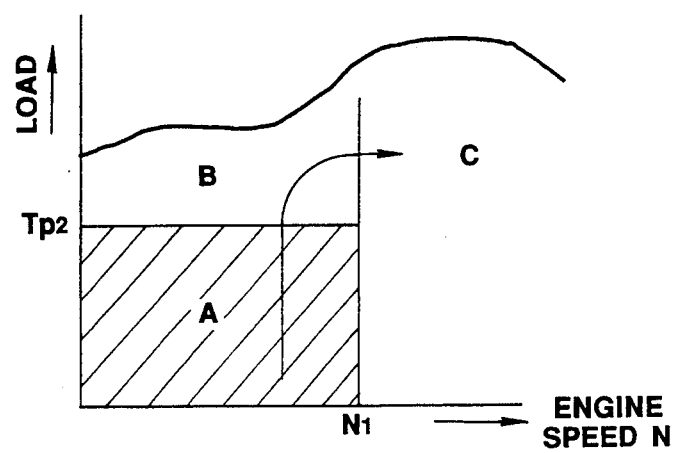
FIG. 9 is a map illustrating various ranges of engine operation.
Figure 10:
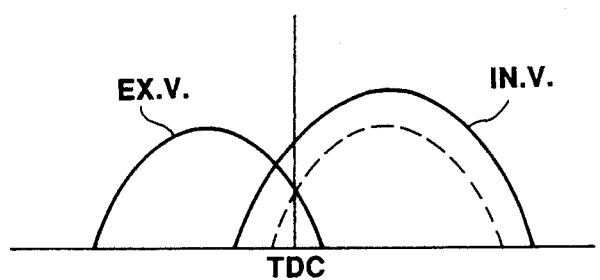
FIG. 10 is a valve lift diagram during engine operation at low and intermediate speeds with high load.
Figure 11:
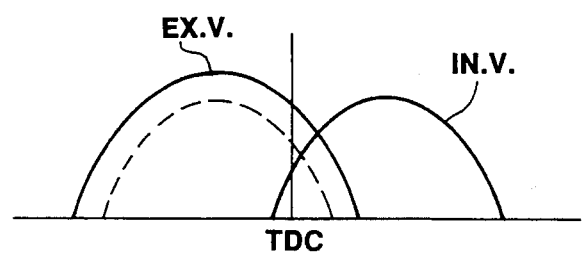
FIG. 11 is another valve lift diagram during engine operation at low and intermediate speeds with high load.

Referring to FIG. 9, the operation is explained. When the engine idles within a range A, both intake and exhaust valves 5 and 6 are operated by the low speed low shift cams, respectively. Thus, the valve overlap is reduced to the minimum degree. Owing to the low speed cam, it is possible to advance the valve close timing of the intake valve 5. Thus, a high volumetric efficiency at low speed is achieved. Upon a shift from the range A to a range B, the high speed cam is used instead of the low speed cam to operate the intake valve 5 as illustrated in FIG. 10 or the high speed cam is used instead of the low speed cam to operate the exhaust valve as illustrated in FIG. 11. The valve close timing of the intake or exhaust valve 5 or 6 is delayed relative to the previous timing, causing a small reduction in volumetric efficiency and a small drop in real compression ratio. This prevents occurrence of knocking. Within a range C, the high speed cams are used to operate both the intake and exhaust valves 5 and 6.

In the previously described system, the VVL mechanisms are arranged for both the intake and exhaust valves 5 and 6. If desired, it is possible to use a VVL mechanism to operate the intake valve 5 only. In this case, within a range A, the low speed cam operates the intake valve 5. Upon a shift from the range A to a range B, the high speed cam is used instead of the low speed cam to operate the intake valve 5. Within a range C, the high speed cam is continued to be used to operate the intake valve 5.

From the previously described examples, it will now be appreciated that the volumetric efficiency and the real compression ratio are increased to the highest possible level during operation within the range B in the case of FIG. 4 or the range A in the case of FIG. 9 and the volumetric efficiency and real compression ratio are slightly decreased upon a shift from the range B to the range C in the case of FIG. 4 and upon a shift from the range A to the range B in the case of FIG. 9. This drop in volumetric effeciency and the drop in real compression ratio prevent occurrence of knocking. In other words, the real compression ratio can be increased to the maximum level during operation within the range B (FIG. 4) and the range A (FIG. 9). Therefore, without relying on spark retard, the occurrence of knocking has been prevented.

What is claimed is:

1. A method of reducing occurrence of knocking in an internal combustion engine having an intake valve and an exhaust valve, comprising:
    at times when load on the engine is lower than a first predetermined load value during operation of the engine at speeds lower than a predetermined engine speed value, operating the intake and exhaust valves at predetermined basic valve timings, respectively, which provide a predetermined basic valve overlap between the intake and exhaust valves;
    at times when load on the engine exceeds said first predetermined load value but fails to exceed a second predetermined load value that is higher than said first predetermined load value during operation of the engine at speeds lower than said predetermined engine speed value, keeping the exhaust valve at said predetermined basic valve timing thereof, and effecting a shift in valve timing of the intake valve in such a direction with respect to a top dead center that the valve overlap between the intake and exhaust valves is increased; and
    at times when load on the engine exceeds said second predetermined load value during operation of the engine at speeds lower than said predetermined engine speed value, keeping the exhaust valve at the predetermined basic valve timing thereof, and effecting a shift in valve timing of the intake valve in such a direction with respect to the top dead center that the valve overlap between the intake and exhaust valves is decreased.

2. A method as claimed in claim 1, wherein during operation of the engine at speeds higher than said predetermined engine speed value, the intake and exhaust valves operate at said predetermined basic valve timings, respectively, which provide said predetermined basic valve overlap between the intake and exhaust valves.

3. A method of reducing occurrence of knocking in an internal combustion engine having an intake valve and an exhaust valve, comprising:
    at times when load on the engine is lower than a first predetermined load value during operation of the engine at speeds lower than a predetermined engine speed value, operating the intake and exhaust valves at predetermined basic valve timings, respectively, which provide a predetermined basic valve overlap between the intake and exhaust valves;
    at times when load on the engine exceeds said first predetermined load value but fails to exceed a second predetermined load value that is higher than said first predetermined load value during operation of the engine at speeds lower than said predetermined engine speed value, keeping the exhaust valve at said predetermined basic valve timing thereof, and effecting a shift in valve timing of the intake valve in such a direction with respect to a top dead center that the valve overlap between the intake and exhaust valves is increased; and
    at times when load on the engine is higher than said second predetermined load value during operation of the engine at speeds lower than said predetermined engine speed value, operating the intake and exhaust valves in said predetermined basic valve timings, respectively, which provide said predetermined basic valve overlap between the intake and exhaust valves.

4. A method as claimed in claim 3, wherein during operation of the engine at speeds higher than said predetermined engine speed value, the intake and exhaust valves operate at said predetermined basic valve timings, respectively, which provide said predetermined basic valve overlap between the intake and exhaust valves.

* * * * *